United States Patent [19]

Newberry

[11] Patent Number: 4,518,509

[45] Date of Patent: May 21, 1985

[54] PARTICULATE COMPOSITIONS

[75] Inventor: Michael E. Newberry, Chesterfield, Mo.

[73] Assignee: Petrolite Corporation, St. Louis, Mo.

[21] Appl. No.: 366,947

[22] Filed: Apr. 9, 1982

[51] Int. Cl.³ .............................................. E21B 37/06
[52] U.S. Cl. ........................................ 252/8.3; 44/62; 252/8.55 B
[58] Field of Search ............. 252/8.3, 8.55 B, 8.55 E, 252/8.55 R; 44/62

[56] References Cited

U.S. PATENT DOCUMENTS

| | | | |
|---|---|---|---|
| 2,364,222 | 12/1944 | Kaufman | 252/8.55 |
| 2,836,559 | 5/1958 | Bock et al. | 252/8.55 |
| 3,454,379 | 7/1969 | Isaacson et al. | 44/62 |
| 3,531,409 | 9/1970 | Seffens et al. | 252/8.55 |
| 3,640,824 | 2/1972 | Bucaram et al. | 252/8.3 |
| 3,661,541 | 5/1972 | Hollyday | 44/62 |
| 3,669,189 | 6/1972 | Fischer | 252/8.3 X |
| 3,879,177 | 4/1975 | Andress | 44/62 |
| 3,926,579 | 12/1975 | Rossi et al. | 252/8.3 X |
| 4,175,926 | 11/1979 | Wisotsky | 44/62 |

FOREIGN PATENT DOCUMENTS

| | | | |
|---|---|---|---|
| 1320943 | 2/1963 | France | 252/8.3 |
| 82811 | 3/1964 | France | 252/8.3 |
| 1161188 | 8/1969 | United Kingdom . | |
| 1274746 | 5/1972 | United Kingdom . | |

Primary Examiner—Herbert B. Guynn
Attorney, Agent, or Firm—Sidney B. Ring; Leon Zitver

[57] ABSTRACT

This invention relates to particulate compositions containing chemical additives for petroleum systems. The particulate compositions when added to petroleum systems gradually dissolve over a period of time, releasing the chemical additive, so as to improve the petroleum system. The use of such particulate compositions has an advantage over the use of the chemical additive itself since the pellets give longer residence time and sustained treatment over a longer period.

13 Claims, No Drawings

PARTICULATE COMPOSITIONS

PARTICULATE COMPOSITIONS

In general practice, various chemical additives are introduced to improve petroleum systems. In such treatments the chemical additive is generally dissolved readily and dissipated rapidly so that it does not gradually treat the system with economical amounts over an extended period of time.

We have now devised particulate compositions containing chemical additives for petroleum systems. The particulate compositions when added to petroleum systems gradually dissolve over a period of time, releasing the chemical additive, so as to improve the petroleum system. The use of such particulate compositions has an advantage over the use of the chemical additive itself since the pellets give longer residence time and sustained treatment over a longer period.

The particulate compositions comprise solid mixtures of chemical additives and polymeric materials. The solid mixtures are prepared so that the chemical additive is gradually released in the petroleum system at the desired temperature and rate.

The chemical additive may be a composition, new or old, which will improve the petroleum system. The polymeric material may be any composition, new or old, which will gradually release the chemical additive into the petroleum system at the desired temperature and rate. They may, for example, be natural or synthetic polymers or waxes.

Any suitable amount of chemical additive can be blended with the polymeric material provided it performs the desired result in the particular system. In practice, it is desirable to have as much of the chemical additive present as possible since it is the active ingredient and the polymeric material is inactive. Therefore, one adds as little as possible of the polymeric material consistent with the desired results.

In practice, one may add, based on polymeric material, as little as about 1% or less to about 50% or more of the chemical additive, by weight.

The preferred material for the first component of the mixture is a low molecular weight linear polyethylene having a melting point of about 50° C. to 150° C. and a molecular weight of about 200 to 10,000. An ideal material suitable for use is a homopolymer of ethylene produced by the Bareco Division of Petrolite Corporation. These linear polyethylenes are called POLYWAX® and numbered by molecular weight. All of these products exhibit sharp melting points which make them ideal for use in this application. The following is a list of the available materials.

| NAME | MOLECULAR WEIGHT | MELTING POINT |
| --- | --- | --- |
| POLYWAX ® 500 | 500 | 86° C. |
| POLYWAX ® 655 | 700 | 102° C. |
| POLYWAX ® 1000 | 1000 | 113° C. |
| POLYWAX ® 2000 | 2000 | 125° C. |

It has been found that a relatively small amount of these polyethylenes when mixed with lower melting point chemical additives result in a mixture with a melting point close to that of the polyethylene. This can be accomplished with as little as 20% polyethylene which allows more of the compound to be the active pour point material. The preferred amount is from 20 to 30%. Quantities higher than 30% result in mixtures that are less oil soluble, sharper melting and contain lower quantities of the active pour point compound. The use of selected melting point and molecular weight polyethylene can result in a variety of melting mixtures for the same pour point compounds.

The composition of this invention can be prepared by any suitable method. In practice, the chemical additive and the polymeric material are heated and mixed above the melting point to yield a homogeneous solution which solidifies upon cooling. The solid solution is then converted in particulate particles of any suitable size such as grinding, pelleting, etc.

The following examples are provided to exhibit certain specific embodiments of the method and composition of this invention. However, these embodiments are presented by way of example and not by way of limitation of the scope of this invention.

EXAMPLE 1

Preparation of Chemical Additive

A copolymer of a $C_{20-24}$ alpha olefin and maleic anhydride was prepared by free radical polymerization. The polymerization was carried out with a 1/1 molar ratio. The copolymer was then further reacted with n-behenyl alcohol (2 moles of alcohol per maleic unit) to form a copolymer of α-olefin and di-n-behenyl maleate. The resulting product had a melting point of 45° C. and is ideally expressed as

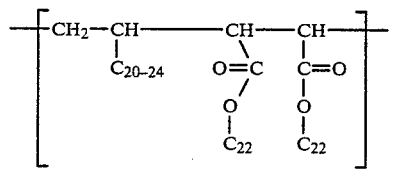

EXAMPLE 2

Preparation of Chemical Additive

A copolymer of a $C_{30+}$ alpha olefin and maleic anhydride was prepared by free radical polymerization in a 1/1 mole ratio. The copolymer was then further reacted with 1 mole of octadecyl amine. The resulting product had a melting point of 42° C. and is the imide ideally expressed as

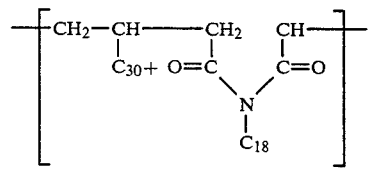

EXAMPLE 3

Preparation of Solid Mixtures

Mixtures of various polyethylenes and the compounds described in Example #1 and #2 were prepared by melting the two components and blending at 150° C. Below is a listing of those compounds, their melting points, and the component melting point:

|  | Polyethylene | Weight Percent | Pour Point Compound | Weight Percent | Melting Point °C. |
|---|---|---|---|---|---|
| Mixture A | POLYWAX ® 500 | 20 | Copolymer 1 | 80 | 75 |
| Mixture B | POLYWAX ® 655 | 20 | Copolymer 1 | 80 | 82 |
| Mixture C | POLYWAX ® 1000 | 20 | Copolymer 1 | 80 | 99 |
| Mixture D | POLYWAX ® 2000 | 20 | Copolymer 1 | 80 | 112 |
| Mixture E | POLYWAX ® 500 | 20 | Copolymer 2 | 80 | 72 |
| Mixture F | POLYWAX ® 655 | 20 | Copolymer 2 | 80 | 80 |
| Mixture G | POLYWAX ® 1000 | 20 | Copolymer 2 | 80 | 97 |
| Mixture H | POLYWAX ® 2000 | 20 | Copolymer 2 | 80 | 110 |
|  | POLYWAX ® 500 | 100 |  |  | 86 |
|  | POLYWAX ® 655 | 100 |  |  | 102 |
|  | POLYWAX ® 1000 | 100 |  |  | 113 |
|  | POLYWAX ® 2000 | 100 |  |  | 125 |
|  |  |  | Copolymer 1 | 100 | 45 |
|  |  |  | Copolymer 2 | 100 | 42 |

These mixtures will gradually dissolve and release the chemical additive in petroleum systems such as crude oils which have temperatures at about the melting point (±10° C. of melting point or higher) as shown in Example 4.

EXAMPLE 4

Solubility Tests

A solubility test was run at various temperatures for each of the prepared mixtures. A solid gram piece of the treating mixture was suspended in a mixture of 80% kerosene and 20% mineral oil. Each piece measured about 1 cc in volume. 20 ml of fluid volume was used. Each sample was allowed to stand at a given temperature for 24 hours before the temperature was increased by 10° C. Table I indicates the degree of solubility during the 24 hour period.

TABLE I
Solubility Study

| Example | 60° C. | 70° C. | 80° C. | 90° C. | 100° C. | 110° C. |
|---|---|---|---|---|---|---|
| Mixture A | PS | S |  |  |  |  |
| Mixture B | I | PS | S |  |  |  |
| Mixture C | I | I | PS | PS | S |  |
| Mixture D | I | I | I | I | PS | S |
| Mixture E | PS | S |  |  |  |  |
| Mixture F | I | PS | S |  |  |  |
| Mixture G | I | I | PS | PS | S | S |
| Mixture H | I | I | I | PS | PS | S |

I = Insoluble, less than 5% loss in 24 hours
PS = Partially soluble, between 5 and 90% loss in 24 hours
S = 90-100% soluble in 24 hours

EXAMPLE 5

Paraffin Deposition Tests

A "cold finger" deposition test was run on a 45° API Michigan crude oil with a cloud point of 70° F., pour point of 60° F. and 10% paraffin wax. A temperature differential of 30° F. was established between the crude oil (80° F.) and the deposition surface (50° F.). A test time of 3 hours was used. Below is a summary of the paraffin inhibition of the mixtures.

TABLE II

| Example | Deposit Weight | Percent Reduction |
|---|---|---|
| Untreated Crude | .72 |  |
| 1000 ppm Mixture A | .25 | 65 |
| 1000 ppm Mixture B | .28 | 61 |
| 1000 ppm Mixture E | .31 | 57 |
| 1000 ppm Mixture F | .40 | 44 |
| 1000 ppm Mixture G | .25 | 65 |

A wide variety of copolymers can be used in this invention, depending on the type of crude oil treated. These copolymers can vary as to type of derivatives, for example, as esters, imides, ester-imides, or mixtures thereof. A wide variety of alcohols and amines can be employed to form derivatives thereof. The following type are illustrative of the derivations:

Type I
Imides

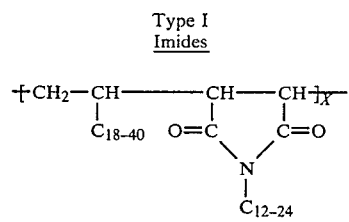

Type II
Esters

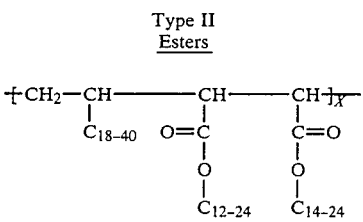

Type III
Combinations of Imides and Esters

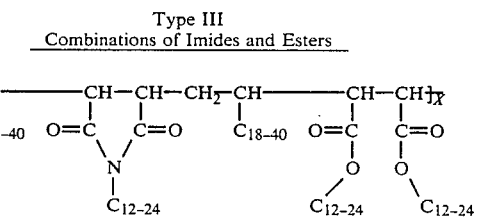

In addition unreacted anhydride or acid group can exist in the polymer structure.

The following Tables illustrate Types and Ratios of the Components used in this Invention

TABLE A

|  | Polyethylene | | |
|---|---|---|---|
|  | Broad Range | Intermediate Range | Preferred Range |
| Mol. wgt. | about 200-10,000 | about 500-3,000 | about 1,000-2,000 |
| m.p. | 50-150° C. | 80-130° C. | 100-125° C. |
| Size particulates | 1μ-1 in. or greater | 1/16 in.-½ in. | ⅛-¼ in. |

TABLE B

| Carbons in Alkyl Side Chains | Copolymer Broad Range | Intermediate Range | Preferred Range |
|---|---|---|---|
| *(1) α-olefin (R) | $C_8$ or greater | $C_{16-50}$ | $C_{20-30}$ |
| **(2) Unsaturated acid, ester, N—derivative, etc. | $C_{12-40}$ | $C_{16-30}$ | $C_{18-22}$ |
| ***(3) Total Carbon Side Chains Sum of (1) + (2) | $C_{14}$ or greater | $C_{28-80}$ | $C_{36-52}$ |

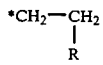

*$CH_2$—$CH_2$ | R

**Total carbons on alcohol moiety of ester and/or N—alkyl groups
***Sum of (1) and (2)

TABLE C

| Percent Weight Ratio of Polyethylene (A) to Copolymer (B) | | |
|---|---|---|
| Broad Range | Intermediate Range | Preferred Range |
| 10–50% | 15–40% | 20–30% |

The compositions of this invention are useful as:

(1) Flow improvers which reduce the viscosity and pour point of petroleum products such as in waxy crudes;

(2) Paraffin inhibitors which reduce paraffin deposition in petroleum products such as in waxy crudes.

For the above uses they may be injected into high temperature subterranean formations penetrated by a well bore into the formation to facilitate the production of waxy crudes.

They can also be added to the formation during the fracturing process for the production of high temperature crudes.

USE AS A POUR POINT DEPRESSANT

This phase of the present invention relates to the application of pour point compounds into waxy crude oils, and more particularly, but not by way of limitation, to a method and composition for the treatment of high temperature subterranean formations and crude oils in order to effect the slow release of an effective amount of flow improving chemical.

This invention relates to a water insoluble particulate composition having controlled slow oil-solubility at high temperatures. The composition makes use of a low molecular weight linear polyethylene of high melting point to encapsulate a normally lower melting point waxy pour point compound to form a homogeneous mixture of high melting point compound. The mixture is then added into the formation well bore or flowline in the form of discrete solid particles which are slowly oil soluble and results in a crude oil with improved pour point and viscosity.

It is a well known fact that crude oils and heavier fractions such as residual fuel oils often contain substantial quantities of waxy materials. When these oils are subjected to low temperatures, the waxy constituents crystallize and agglomerate into a solid gel. The gelling or stiffening of the oil interferes with the normal production of the oil and causes a number of handling problems. High viscosities and pour points result in a number of additional costs to production such as increased horsepower, equipment size and fuel to heat the crude. Particularly affected by these rheological problems are long distance pipelines and offshore production facilities.

Many of the aforementioned problems have been alleviated in part by the addition of known pour depressants. Most of the proven pour point compounds for crude oils make use of a long alkyl side chain of from 14 to 30 carbon atoms spaced along a polymeric backbone. These branched chain structures then cocrystallize with the paraffin waxes and reduce the size of the crystals and their tendency to form gelled structures.

For example British Pat. No. 1161188 discloses polymers containing aliphatic side chains of at least 14 carbon atoms formed by the polymerization of unsaturated compounds. British Pat. No. 1274746 discloses the use of an ester of a copolymer of maleic anhydride and vinyl acetate where the ester is derived from an alcohol containing at least 20 carbon atoms. U.S. Pat. No. 3,926,579 discloses the use of alpha olefin polymers and copolymers as pour point reducers. U.S. Pat. No. 3,344,859 discloses the use of naphthalene as a paraffin inhibitor where the naphthalene is placed into the formation as a molten liquid and upon cooling to the formation temperature will solidify. The naphthalene then will slowly dissolve in the crude oil and allow a slow release of inhibiting agent. U.S. Pat. No. 3,640,824 discloses the use of a mixture of branched polyethylene with a molecular weight greater than 6000 and naphthalene and/or microcrystalline wax and/or asphaltenes as a paraffin inhibitor. U.S. Pat. No. 3,630,280 discloses a method and composition for treating subterranean formations which consits of placing a solid mixture of high molecular weight ethylene vinyl acetate, low molecular weight ethylene vinyl acetate and a paraffin wax with a melting point between 135° and 170° F. This mixture allows slow controlled oil solubility in formations having temperatures between 125° and 155° F.

We have now discovered a composition and method of treating waxy crude oils to improve their flow properties that allows the treatment of subterranean formations with temperatures greater than 155° F. More particularly it is now possible to achieve the slow release of an effective quantity of pour point compound at formation temperatures above 230° F. The invention consists of a crude oil composition containing a flow improver having as the essential ingredients therein and in an amount effective to reduce viscosity and pour point, a solid mixture of (1) A low molecular weight linear polyethylene and (2) A copolymer of a long chain alpha olefin and an unsaturated dicarboxylic acid, anhydride, or derivative thereof, such as the alcohol or amine reaction product of the acid or anhydride. The above mixture is placed into the formation or crude oil at a location where the oil temperature is slightly below the melting point of the mixture. The range of available products covered by the above mixture would be 70°-150° C. The crude oil temperature could then range from 65°-145° C. The amount added would be sufficient to allow a solubility rate of 0.001 to 2.0% compound in the crude oil for a period of time, normally at least 10 days.

One of the greatest problems related to the use of any pour point compound in most oilfield environments is the poor physical properties associated with these high molecular weight materials. Most effective chemicals are either high melting solids or high pour point liquids or gels which pose a variety of handling problems in low temperature environments. Heated storage at the wellhead or dilution with solvents is normally required to allow continuous injection. Normal dilution may require as much as 95 to 98% solvent in order to achieve a pour point of below 0° F. The present invention indicates a method and composition which allows the placement of an effective pour point compound into a high temperature reservoir or fluid. The melting point of most concentrated pour point compounds is so low that if placed in a 100° C. formation they would rapidly melt and be flushed out with the crude oil.

The composition disclosed allows the placement of a normally low melting solid pour point compound into a formation with a much higher temperature because of the presence of a linear low molecular weight polyethylene which surrounds the pour point compound and raises the melting point of the resulting mixture. The placement of a selected mixture into a formation whose temperature is slightly lower than the melting point of the mixture, i.e. 5°-10° C. allows the slow release of the pour point compound into the crude oil.

The preferred material for the first component of the mixture is a low molecular weight linear polyethylene. An ideal material suitable for use is a homopolymer of ethylene sold by Petrolite Corporation. These linear polyethylenes are called POLYWAX ® and numbered by molecular weight. All of these products exhibit sharp melting points which make them ideal for use in this application. The following is a list of the available materials.

| NAME | MOLECULAR WEIGHT | MELTING POINT |
| --- | --- | --- |
| POLYWAX ® 500 | 500 | 86° C. |
| POLYWAX ® 655 | 700 | 102° C. |
| POLYWAX ® 1000 | 1000 | 113° C. |
| POLYWAX ® 2000 | 2000 | 125° C. |

It has been found that a discrete amount of these polyethylenes when mixed with lower melting point pour point compounds result in a mixture with a melting point close to that of the polyethylene. This can be accomplished with as little as 20% polyethylene which allows a majority of the compound to be the active pour point material. The preferred amount is from 20 to 30%. Quantities higher than 30% result in mixtures that are less oil soluble, sharper melting and contain lower quantities of the active pour point compound. The use of selected melting point and molecular weight polyethylene can result in a variety of melting mixtures for the same pour point compounds.

The preferred material for the second component of the mixture is a homopolymer or copolymer containing long alkyl side chains of at least 14 carbon atoms. These side chains are unbranched and saturated. The polymers and copolymers consist of a main chain backbone built up of carbon atoms and the main chain contains a number of long side chains. These side chains can be attached directly to the main chain backbone or indirectly via one or more oxygen and/or carbon atoms. One example of particular application is attachment of the side chain via a carboxyl group. The polymers are prepared typically by the polymerization of olefinically unsaturated compounds. These unsaturated compounds can either already contain the long side chains or the side chains can be attached during a second reaction to the polymer backbone. One system of particular interest is the polymerization of long chain alpha olefins and maleic anhydride. The polymer backbone is then further reacted with a long chain alcohol to form side chains linked via an ester functionality. These copolymers are typically low molecular weight 2,000-50,000 and wax like in nature. It is the physical properties associated with these wax-like polymers that make them so difficult to handle in general oilfield usage. It is the purpose of this invention to provide a treating mixture that can be used in high temperature reservoirs where the polymer alone would be rapidly melted and flushed from the system.

USE AS A PARAFFIN INHIBITOR

This phase of the present invention relates to the application of paraffin inhibitors into waxy crude oils, and more particularly, but not by way of limitation, to a method and composition for the treatment of high temperature subterranean formations and crude oils in order to effect the slow release of an effective amount of paraffin inhibitor.

This invention relates to a water insoluble particulate composition having controlled slow oil-solubility at high temperatures. The composition makes use of a low molecular weight linear polyethylene of high melting poing to encapsulate a normally lower melting point waxy paraffin inhibitor to form a homogeneous mixture of high melting point compound. The mixture is then added into the formation well bore or flowline in the form of discrete solid particles which are slowly oil soluble and results in a crude oil with reduced paraffin deposition tendencies.

It is a well known fact that crude oils and heavier fractions such as residual fuel oils often contain substantial quantities of waxy materials. When these oils are subjected to low temperatures, the waxy constituents crystallize and agglomerate into a solid gel. The gelling or stiffening of the oil interfers with the normal production of the oil and causes a number of handling problems. High viscosities and pour points result in a number of additional costs to production such as increased horsepower, equipment size and fuel to heat the crude. Particularly affected by these rheolocial problems are long distance pipelines and offshore production facilities.

In addition to higher viscosities many crude oils will actually deposit the wax crystals directly on the cold surfaces as the crude is cooled during its production. The decrease in solubility of the wax in the crude oil with decreasing temperature results in deposits which further reduces the volume of oil that can be produced.

Many of the aforementioned problems have been alleviated in part by the addition of known paraffin inhibitors. Most of the proven paraffin inhibitors for crude oils make use of a long alkyl side chain of from 14 to 30 carbon atoms spaced along a polymeric backbone. These branched chain structures then co-crystallize with the paraffin waxes and reduce the size of the crystals and their tendency to agglomerate on cold surfaces.

For example British Pat. No. 1161188 discloses polymers containing aliphatic side chains of at least 14 carbon atoms formed by the polymerization of unsaturated compounds. British Pat. No. 1274746 discloses the use of an ester of a copolymer of maleic anhydride and vinyl acetate where the ester is derived from an alcohol containing at least 20 carbon atoms. U.S. Pat. No. 3,926,579 discloses the use of alpha olefin polymers and copolymers as pour point reducers. U.S. Pat. No. 3,344,859 discloses the use of naphthalene as a paraffin inhibitor where the naphthalene is placed into the formation as a molten liquid and upon cooling to the formation temperature will solidify. The napthalene then will slowly dissolve in the crude oil and allow a slow release of inhibiting agent. U.S. Pat. No. 3,640,824 discloses the use of a mixture of branched polyethylene with a molecular weight greater than 6000 and napthalene and/or microcrystalline wax and/or asphaltenes as a paraffin inhibitor. U.S. Pat. No. 3,630,280 discloses a method and composition for treating subterranean formations which consists of placing a solid mixture of high molecular weight ethylene vinyl acetate, low molecular weight ethylene vinyl acetate and a paraffin wax with a melting point between 135° and 170° F. This mixture allows slow controlled oil solubility in formations having temperatures between 125° and 155° F. U.S. Pat. No. 3.879,177 discloses the use of a copolymer of maleic anhydride and vinyl methyl ether esterified with an alcohol containing 18 to 24 carbon atoms to inhibit the crystallization of wax and reduce its deposition on cold surfaces as demonstrated by the well known "cold finger" test.

We have now discovered a composition and method of treating waxy crude oils to reduce their paraffin deposition that allows the treatment of subterranean formations with temperatures greater than 155° F. More particularly it is now possible to achieve the slow release of an effective quantity of paraffin inhibitor at formation temperatures above 230° F. The invention consists of a crude oil composition containing a paraffin inhibitor having as the essential ingredients therein and in an amoumt effective to reduce paraffin deposition a solid mixture of (1) A low molecular weight linear polyethylene and (2) A copolymer of a long chain alpha olefin and an unsaturated dicarboxylic acid, anhydride, or derivative thereof, such as the alcohol or amine reaction product of the acid or anhydride. The above mixture is placed into the formation or crude oil at a location where the oil temperature is slightly below the melting point of the mixture. The range of available products covered by the above mixture would be 70°–150° C. The crude oil temperature could then range from 65°–145° C. The amount added would be sufficient to allow a solubility rate of 0.001 to 2.0% compound in the crude oil for a period of time, normally at least 10 days.

One of the greatest problems related to the use of paraffin inhibitors in most oilfield environments is the poor physical properties associated with these high molecular weight materials. Most effective chemicals are either high melting solids or high pour point liquids or gels which pose a variety of handling problems in low temperature environments. Heated storage at the wellhead or dilution with solvents is normally required to allow continuous injection. Normal dilution may require as much as 95 to 98% solvent in order to achieve an adequate paraffin inhibitor. The present invention indicates a method and composition which allows the placement of an effective paraffin inhibitor into a high temperature reservoir or fluid. The melting point of most concentrated paraffin inhibitors is so low that if placed in a 100° C. formation they would rapidly melt and be flushed out with the crude oil.

The composition disclosed allows the placement of a normally low melting solid paraffin inhibitor into a formation with a much higher temperature because of the presence of a linear low molecular weight polyethylene which surrounds the paraffin inhibitor and raises the melting point of the resulting mixture. The placement of a selected mixture into a formation whose temperature is slightly lower than the melting point of the mixture i.e. 5°–10° C. allows the slow release of the paraffin inhibitor into the crude oil.

The preferred material for the first component of the mixture is a low molecular weight linear polyethylene. An ideal material suitable for use is a homopolymer of ethylene sold by Petrolite Corporation. These linear polyethylenes are called POLYWAX ® and numbered by molecular weight. All of these products exhibit sharp melting points which make them ideal for use in this application. The following is a list of the available materials.

| NAME | MOLECULAR WEIGHT | MELTING POINT |
| --- | --- | --- |
| POLYWAX ® 500 | 500 | 86° C. |
| POLYWAX ® 655 | 700 | 102° C. |
| POLYWAX ® 1000 | 1000 | 113° C. |
| POLYWAX ® 2000 | 2000 | 125° C. |

It has been found that a discrete amount of these polyethylenes when mixed with lower melting point paraffin inhibitor result in a mixture with a melting point close to that of the polyethylene. This can be accomplished with as little as 20% polyethylene which allows a majority of the compound to be the active pour point material. The preferred amount is from 20 to 30%. Quantities higher than 30% result in mixtures that are less oil soluble, sharper melting and contain lower quantities of the active pour point compound. The use of selected melting point and molecular weight polyethylene can result in a variety of melting mixtures for the same paraffin inhibiting compounds.

The preferred material for the second component of the mixture is a homopolymer or copolymer containing long alkyl side chains of at least 14 carbon atoms. These side chains are unbranched and saturated. The polymers and copolymers consist of a main chain backbone built up of carbon atoms and the main chain contains a number of long side chains. These side chains can be attached directly to the main chain backbone or indirectly via one or more oxygen and/or carbon atoms. One example of particular application is attachment of the side chain via a carboxyl group. The polymers are prepared typically by the polymerization of olefinically unsaturated compounds. These unsaturated compounds can either already contain the long side chains or the side chains can be attached during a second reaction to the polymer backbone. One system of particular interest is the polymerization of long chain alpha olefins and maleic anhydride. The polymer backbone is then further reacted with a long chain alcohol to form side chains linked via an ester functionality. These copolymers are typically low molecular weight 2,000–50,000 and wax like in nature. It is the physical properties associated with these wax-like polymers that make them so difficult to handle in general oilfield usage. It is the purpose of this invention to provide a treating mixture that can be used in high temperature reservoirs where the polymer alone would be rapidly melted and flushed from the system, these provided little long term benefit.

I claim:

1. A composition of matter comprising solid mixture of:

(1) a linear polyethylene having a melting point of about 50° to 150° C., and a molecular weight of about 200 to 10,000, and (2) a chemical additive selected from the group consisting of pour point depressants and paraffin inhibitors for a waxy petroleum system, said chemical additive having a lower melting point than said polyethylene, and being a copolymer wherein the recurring unit is selected from the group consisting of

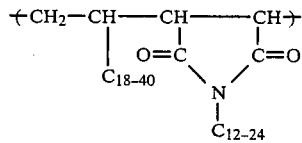

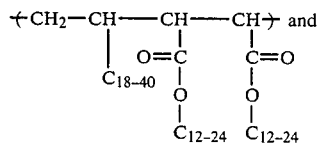

-continued

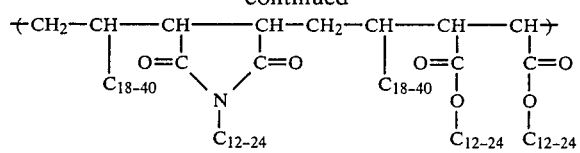

said mixture capable of slowly dissolving in the petroleum system at a temperature of above about 80° C. at a rate sufficient to gradually release said chemical additive into said petroleum system over an extended period of time.

2. The composition of claim 1 where the copolymer is a copolymer of a $C_{20-24}$ to $C_{30+}$ α-olefin, n-behenyl maleate and/or N-$C_{12-24}$ maleimide.

3. The composition of claim 1 having about 20% to 30% by weight polyethylene.

4. The composition of claim 3 where the copolymer is a copolymer of a $C_{20-24}$ to $C_{30+}$ α-olefin, n-behenyl maleate and/or N-$C_{12-24}$ maleimide.

5. The composition of claim 1 wherein the polyethylene has a melting point of about 80° C. to 130° C. and a molecular weight of about 500 to 3000.

6. The composition of claim 1 wherein the polyethylene has a melting point of about 100° C. to 125° C. and a molecular weight of about 1000 to 2000.

7. A waxy petroleum system containing the composition of claim 1.

8. A waxy petroleum system containing the composition of claim 2.

9. A waxy petroleum system containing the composition of claim 4.

10. A process of reducing the pour point and/or viscosity of a waxy petroleum system which comprises treating said system with the composition of claim 1.

11. A process of inhibiting paraffin deposition in a waxy petroleum system which comprises treating said system with the composition of claim 1.

12. A process of reducing the pour point and/or viscosity of a waxy petroleum system which comprises treating said system with the composition of claim 4.

13. A process of inhibiting paraffin deposition in a waxy petroleum system which comprises treating said system with the composition of claim 4.

* * * * *